(12) United States Patent
Thoppal et al.

(10) Patent No.: US 8,868,530 B1
(45) Date of Patent: Oct. 21, 2014

(54) METHOD AND SYSTEM FOR MANAGING LOCKS IN STORAGE SYSTEMS

(75) Inventors: Omprakaash Thoppal, Seven Fields, PA (US); William A. Zumach, Pittsburgh, PA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 13/550,470

(22) Filed: Jul. 16, 2012

(51) Int. Cl.
*G06F 17/00* (2006.01)
(52) U.S. Cl.
USPC .......................................................... 707/704
(58) Field of Classification Search
CPC .............................. G06F 3/065; G06F 19/3418
USPC ........................................................... 707/655
See application file for complete search history.

(56) References Cited

U.S. PATENT DOCUMENTS

| | | | | |
|---|---|---|---|---|
| 5,555,388 | A * | 9/1996 | Shaughnessy | 711/100 |
| 6,973,549 | B1 * | 12/2005 | Testardi | 711/150 |
| 2002/0194429 | A1 * | 12/2002 | Chiu et al. | 711/118 |
| 2008/0082533 | A1 * | 4/2008 | Wang et al. | 707/8 |
| 2008/0281825 | A1 * | 11/2008 | Meng | 707/8 |
| 2009/0063488 | A1 * | 3/2009 | Daum et al. | 707/8 |

OTHER PUBLICATIONS

Opportunistic Locks, Aug. 26, 2013 http://msdn.microsoft.com/en-us/library/windows/desktop/aa365433(v=vs.85).aspx Provides evidential support on how oplocks operate.*

* cited by examiner

*Primary Examiner* — Sherief Badawi
*Assistant Examiner* — Courtney Harmon
(74) *Attorney, Agent, or Firm* — Klein, O'Neill & Singh, LLP

(57) ABSTRACT

Machine implemented method and system for a networked storage system having a first storage system node providing storage space to a client computing system at a first storage device and a second storage system node managing a second storage device are provided. A lock is granted by the first storage system node to the client computing system for accessing a data container stored at the first storage device. The first storage system node updates a lock data structure for managing the lock granted to the client computing system. Information regarding the lock is then replicated at the second storage system node, such that the second storage system node can recover the lock, when the first storage system node becomes unavailable and the second storage system node takes over the first storage device to interface with the client computing system.

20 Claims, 9 Drawing Sheets

METHOD AND SYSTEM FOR MANAGING LOCKS IN STORAGE SYSTEMS

TECHNICAL FIELD

The present disclosure relates to storage systems and more particularly to managing locks in storage systems.

RELATED ART

A storage system typically comprises one or more storage devices where information may be stored and from where information may be retrieved, as desired. The storage system may be implemented in accordance with a variety of storage architectures including, but not limited to, a network-attached storage (NAS) environment, a storage area network (SAN) and a storage device assembly directly attached to a client or host computer.

The storage system typically includes a storage operating system that may implement a high-level module, such as a file system, to logically organize information stored at storage volumes as a hierarchical structure of data containers, such as files and logical units. For example, stored files may be implemented as set of data structures, i.e., storage device blocks, configured to store information, such as the actual data for the file. These data blocks are typically organized within a volume block number (vbn) space that is maintained by the file system. The file system typically organizes the data blocks within the vbn space as a "logical volume"; each logical volume may be, although is not necessarily, associated with its own file system.

The storage system may be configured to operate according to a client server model of information delivery to thereby allow many clients to access data containers stored on the system. In this model, the client may comprise an application, such as a database application, executing in a computer that communicates with the storage system. Each client may send input/output ("I/O") requests to read and write data containers.

A plurality of storage systems may be interconnected to service numerous client requests. The plurality of storage systems provide redundancy to clients, which means that if one storage system becomes unavailable, then another storage system takes over the storage space provided to the client. In such an environment, managing rights associated with I/O operations is a challenge. Rights may be managed by issuing locks to one or more client application (may also be referred to as "a client") on a data container residing at a storage volume. The lock provides certain rights to the client to perform read and write operations with respect the data container. Continuous efforts are being made to better manage locks in networked storage systems.

SUMMARY

In one embodiment, a machine implemented method and system for a networked storage system having a first storage system node providing storage space to a client computing system at a first storage device and a second storage system node managing a second storage device are provided. A lock is granted by the first storage system node to the client computing system for accessing a data container stored at the first storage device. The first storage system node updates a lock data structure for managing the lock granted to the client computing system. Information regarding the lock is then replicated mirrored) at the second storage system node, such that the second storage system node can recover the lock, when the first storage system node becomes unavailable and the second storage system node takes over the first storage device to interface with the client computing system.

In another embodiment, a networked storage system is provided. The system includes a first storage system node configured to grant a lock to a client computing system for accessing a data container stored at a first storage device; and a second storage system node for replicating information regarding the lock at a second storage device managed by the second storage system node, such that the second storage system node can recover the lock, when the first storage system node becomes unavailable and the second storage system node takes over the first storage device to interface with the client computing system.

The mirrored information regarding the lock includes an identifier identifying the client computing system, a reconnect key that allows the client computing system to reconnect and obtain the lock from the second storage system node when the first storage system node becomes unavailable; an identifier identifying the data container and an identifier identifying a storage volume associated with the storage device used for storing the data container.

In yet another embodiment, a machine implemented method for a networked storage system having a first storage system node providing storage space to a client computing system at a first storage device and a second storage system node managing a second storage device. The method includes mirroring information regarding any lock granted by the first storage system to the client computing system at the second storage system node, such that the second storage system node can recover the lock, when the first storage system node becomes unavailable and the second storage system node takes over the first storage device to interface with the client computing system; and notifying by the second storage system node to the first storage system node that the information regarding any granted lock has been successfully mirrored at the second storage system node.

In another embodiment, a machine implemented method for a networked storage system having a first storage system node providing storage space to a client computing system at a first storage device and a second storage system node managing a second storage device is provided. The method includes granting a lock by the first storage system node to the client computing system for accessing a data container stored at the first storage device; and mirroring information regarding the lock at the second storage system node, such that the second storage system node can recover the lock, when the first storage system node becomes unavailable and the second storage system node takes over the first storage device to interface with the client computing system.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one embodiment, a machine implemented method and system for a networked storage system having a first storage system node providing storage space to a client computing system at a first storage device and a second storage system node managing a second storage device is provided. A lock is granted by the first storage system node to the client computing system for accessing a data container stored at the first storage device. The first storage system node updates a lock data structure managing the lock granted to the client computing system. Information regarding the lock is then replicated (or mirrored) at the second storage system node, such that the second storage system node can recover (or construct) the lock, when the first storage system node becomes unavailable and the second storage system node takes over the first storage device to interface with the client computing system.

To facilitate an understanding of the various embodiments of the present disclosure, the general architecture and operation of a networked, clustered storage system will now be described.

Figure 1:
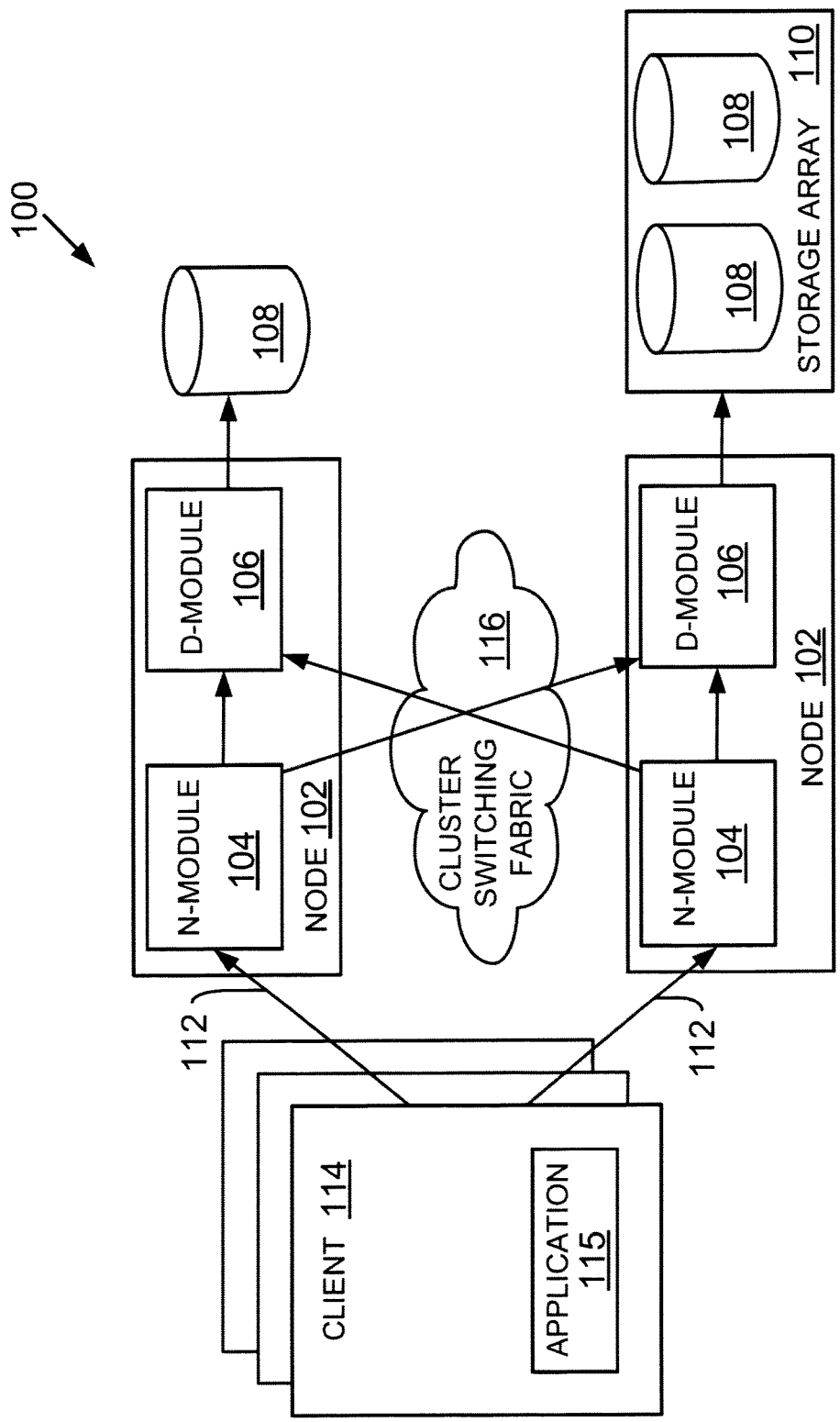
FIG. 1 shows a block diagram of a clustered system using the methodology of the present disclosure.

Clustered System:

FIG. 1 is a schematic block diagram of a plurality of storage system nodes 102 interconnected as a cluster 100 and configured to provide storage services related to organization of information at storage devices. Nodes 102 interface with various client computing systems 114 for reading and writing information stored at storage devices 108 managed by the nodes 102.

As described below in detail, each node maintains a lock data structure for managing locks that are granted to client computing systems (may also be referred to as clients) 114 for accessing a data container managed by a node. A lock as used herein means a mechanism used by node 102 to limit access to a data container. There are various "rights" associated with the locks issued or revoked with respect to a data container. The term "rights" as used herein means a privilege that is granted to an entity, for example, a client application executed at a computing device, with respect to any input/output (I/O) operation, for example, read and write operations. The term data containers as used throughout this specification mean a file, a logical unit, or any other information. The term file is used interchangeably with data container, throughout this specification.

Nodes 102 comprise various functional components that cooperate to provide distributed storage system architecture of cluster 100. Each node 102 is generally organized as a network element (N-module 104) and a storage device element (D-module 106). N-module 104 includes functionality that enables node 102 to connect to client computing systems 114 over a network connection 112, while each D-module 106 connects to one or more storage devices, such as 108 or a storage array 110. Illustratively, network 112 may be embodied as an Ethernet network, a Fibre Channel (FC) network or any other network type. Nodes 102 may be interconnected by a cluster switching fabric 116 which, in the illustrative embodiment, may be embodied as a Gigabit Ethernet switch or any other switch type.

It should be noted that while there is shown an equal number of N and D-modules in the illustrative cluster 100, there may be differing numbers of N and/or D-modules in accordance with various embodiments of the present disclosure. For example, there may be a plurality of N-modules and/or D-modules interconnected in a cluster configuration 100 that does not reflect a one-to-one correspondence between the N and D-modules. As such, the description of node 102 comprising one N-module and one D-module should be taken as illustrative only.

Clients 114 may be general purpose computers having a plurality of components, as described below in detail with respect to FIG. 5. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with the CPU and main memory is often referred to as a host system.

Clients 114 may be configured to interact with a node 102 in accordance with a client/server model of information delivery. That is, each client 114 may request the services of the node 102, and node 102 may return the results of the services requested by the client 114 over network 112.

Clients 114 may be configured to execute processor executable instructions, shown as application 115 for reading and writing information at storage devices 108. Such application 115 may include a database application, a financial management system, an electronic mail application or any other application type.

Client 114 may issue packets using application 115 including file-based access protocols, such as the Common Internet File System ("CIFS") protocol or the Network File System ("NFS") protocol, over the Transmission Control Protocol/Internet Protocol ("TCP/IP") when accessing information in the form of certain data containers. Alternatively, the client 114 may issue packets using application 115 including block-based access protocols, such as the Small Computer Systems Interface ("SCSI") protocol encapsulated over TCP ("iSCSI") and SCSI encapsulated over Fibre Channel ("FCP"), when accessing information in the form of other data containers, such as blocks.

Figure 2:
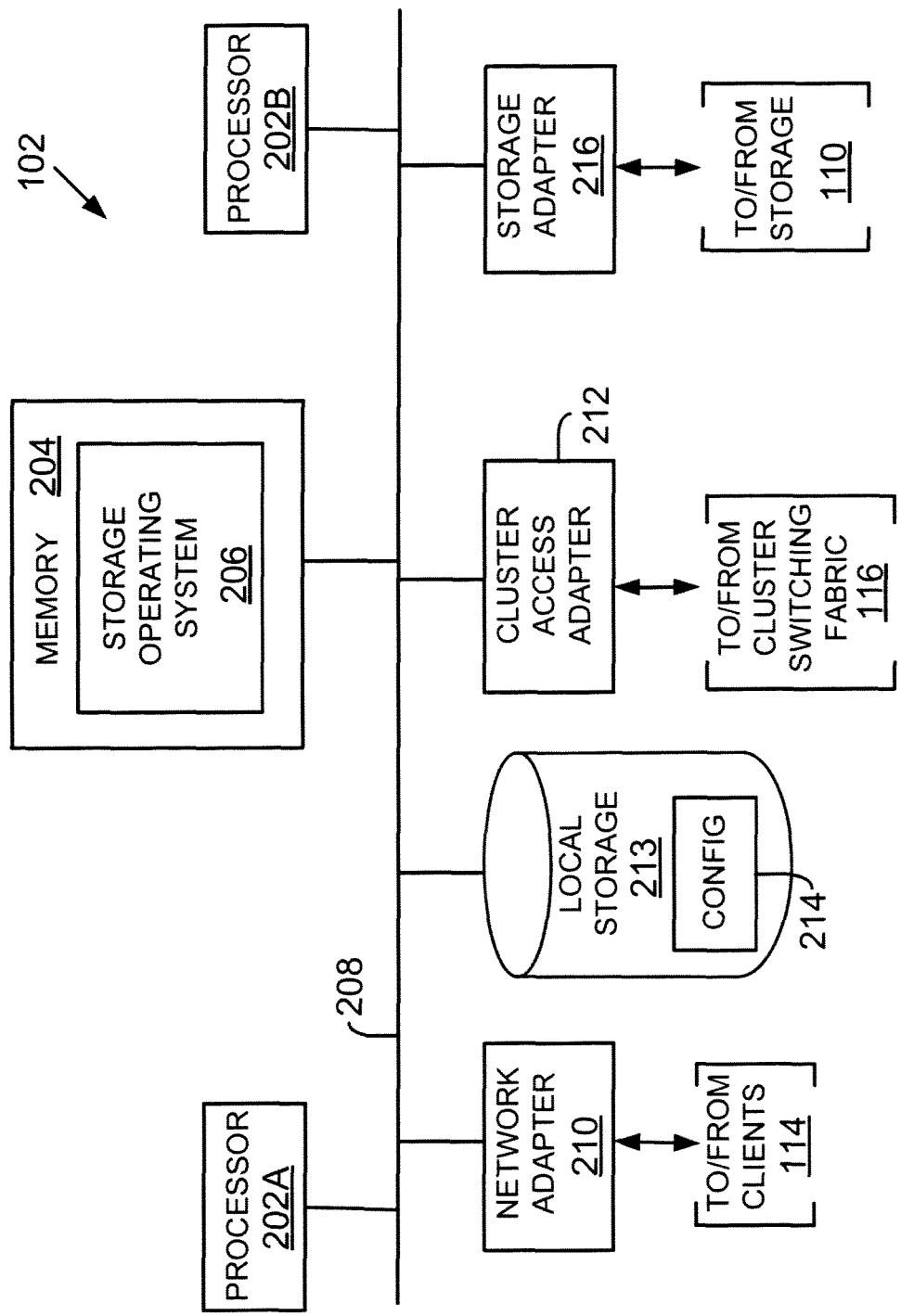
FIG. 2 shows an example of a node used by the system of FIG. 1.

Storage System Node:

FIG. 2 is a block diagram of a node 102 that is illustratively embodied as a storage system comprising of a plurality of processors 202A-202B, a memory 204, a network adapter 210, a cluster access adapter 212, a storage adapter 216 and local storage 213 interconnected by an interconnect system (referred as bus) 208. The local storage 213 comprises one or more storage devices, such as disks, non-volatile storage devices, flash drives, video tape, optical, DVD, magnetic tape, bubble memory, electronic random access memory, micro-electro mechanical and any other similar media adapted to store information. The local storage 213 may be utilized by the node to locally store configuration information (e.g., in a configuration data structure 214).

Processors 202A/202B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices. The bus system 208 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The cluster access adapter 212 comprises a plurality of ports adapted to couple node 102 to other nodes of cluster 100. In the illustrative embodiment, Ethernet may be used as the clustering protocol and interconnect media, although it will be apparent to those skilled in the that other types of protocols and interconnects may be utilized within the cluster architecture described herein. In alternate embodiments where the N-modules and D-modules are implemented on separate storage systems or computers, the cluster access adapter 212 is utilized by the N/D-module for communicating with other N/D-modules in the cluster 100.

The network adapter 210 comprises a plurality of ports adapted to couple the node 102 to one or more clients 114 over point-to-point links, wide area networks, virtual private networks implemented over a public network (Internet) or a shared local area network. The network adapter 210 thus may comprise the mechanical, electrical and signaling circuitry needed to connect the node to the network.

The storage adapter 216 cooperates with a storage operating system 206 executing on the node 102 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the storage devices 108 of array 110 (FIG. 1).

The storage adapter 216 comprises a plurality of ports having input/output (I/O) interface circuitry that couples to the storage devices over an I/O interconnect arrangement, such as a conventional high-performance, FC link topology.

It is noteworthy that although various adapters (210, 212 and 216) have been shown as separate hardware based components, the embodiments disclosed herein are not limited to separate components. The embodiments disclosed herein may be implemented using a converged network adapter (CAN) that is capable of handling both network and storage protocols, for example, a Fibre Channel over Ethernet (FCoE) adapter.

Each node 102 is illustratively embodied as a multiple processor system executing the storage operating system 206 that preferably implements a high-level module, such as a file system, to logically organize the information as a hierarchical structure of named directories, files and special types of files called virtual disks (hereinafter generally "blocks") on storage devices 108. However, it will be apparent to those of ordinary skill in the art that the node 102 may alternatively comprise a single or more than two processor systems. Illustratively, one processor 202A executes the functions of the N-module 104 on the node, while the other processor 202B executes the functions of the D-module 106.

The memory 204 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various non-transitory computer readable media, may be used for storing and executing program instructions pertaining to the disclosure described herein.

The storage operating system 206, portions of which is typically resident in memory and executed by the processing elements, functionally organizes the node 102 by, inter alia, invoking storage operations in support of the storage service implemented by the node and maintaining a lock data structure for managing various lock types that are issued to client applications. An example of operating system 206 is the DATA ONTAP® (Registered trademark of NetApp, Inc.) operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings disclosed herein.

Storage of information on each storage array 110 is preferably implemented as one or more storage "volumes" that comprise a collection of physical storage devices 108 cooperating to define an overall logical arrangement of volume block number (vbn) space on the volume(s). Each logical volume is generally, although not necessarily, associated with its own file system. The storage devices 108 within a logical volume/file system are typically organized as one or more groups, wherein each group may be operated as a Redundant Array of Independent (or Inexpensive) Disks (RAID).

Storage operating system 206 maintains a plurality of lock types in responding to client 114 requests for reading a data container, writing a data container or modifying a data container. The following provides a brief description of the various lock types that may be used by storage operating system 206 for managing access to data containers.

"Opportunistic Lock" (may also be referred to as "OpLock") means a lock that is placed by one or more client application (may also be referred to as "a client") on a data container residing at a storage volume. The OpLock information may be embedded in a data container attribute (for example, meta-data) for the data container. OpLock, based on client requests, coordinates data caching and coherency between clients and storage systems. Coherent data in this context means data that is the same across a network i.e. data stored by the storage system and locally by the clients is synchronized. OpLocks are defined by the CIFS protocol and there are different types of OpLocks, for example, Level 1, Level 2 and other types. The rights associated with an OpLock depend on the OpLock type.

A "Shared Lock" is typically granted to a client application (115) by storage operating system 206. The shared lock allows more than one application 115 to access a data container.

"Byte lock" is a lock type that limits access to a portion of a data container. A client may request to open a data container and request a lock for a byte range of the file.

"Persistent Open" is a feature that may be used for various locks issued by storage operating system 206. The persistent open feature provides an exclusive right to a data container. When a node 102 grants a persistent open lock to a data container, it also provides a reconnect key to the client. If the node becomes unavailable for any reason, the persistent open lock stays open for a duration "t" and within that duration, the client may use the reconnect key to obtain the lock and access to the data container.

To manage the various locks, storage operating system 206 includes a lock manager that maintains one or more lock data structures for managing the locks. Details regarding the lock manager and the lock data structures are provided below.

Figure 3A:
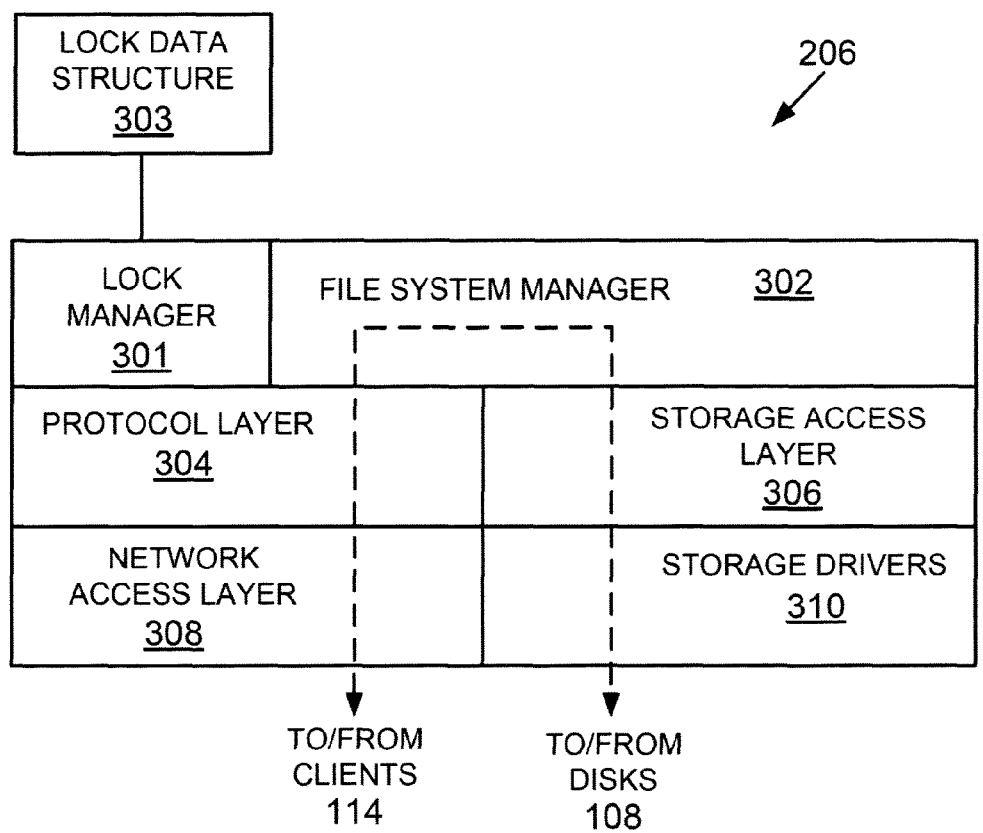
FIGS. 3A and 3B show examples of an operating system used according to one embodiment of the present disclosure.

Operating System:

FIG. 3A illustrates a generic example of operating system 206 executed by node 102, according to one embodiment of the present disclosure. In one example, operating system 206 may include several modules, or "layers" executed by one or both of N-Module 104 and D-Module 106. These layers include a file system manager 302 that keeps track of a directory structure (hierarchy) of the data stored in storage devices 108 and manages read/write operations, i.e. executes read/write operations on storage devices in response to client 114 requests. Operating system 206 may also include a lock manager 301 that maintains one or more lock data structures 303 for managing the various locks used for limiting access to data containers stored within cluster 100. Details lock manager 301 and lock data structure 303 are provided below.

Operating system 206 may also include a protocol layer 304 and an associated network access layer 308, to allow node 102 to communicate over a network with other systems, such as clients 114. Protocol layer 304 may implement one or more of various higher-level network protocols, such as NFS, CIFS, Hypertext Transfer Protocol (HTTP), TCP/IP and others, as described below.

Network access layer 308 may include one or more drivers, which implement one or more lower-level protocols to communicate over the network, such as Ethernet. Interactions between clients 114 and mass storage devices 108 are illustrated schematically as a path, which illustrates the flow of data through operating system 206.

The operating system 206 may also include a storage access layer 306 and an associated storage driver layer 310 to allow D-module 106 to communicate with a storage device.

The storage access layer 306 may implement a higher-level disk storage protocol, such as RAID, while the storage driver layer 310 may implement a lower-level storage device access protocol, such as FC (Fibre Channel) or SCSI.

Figure 3B:
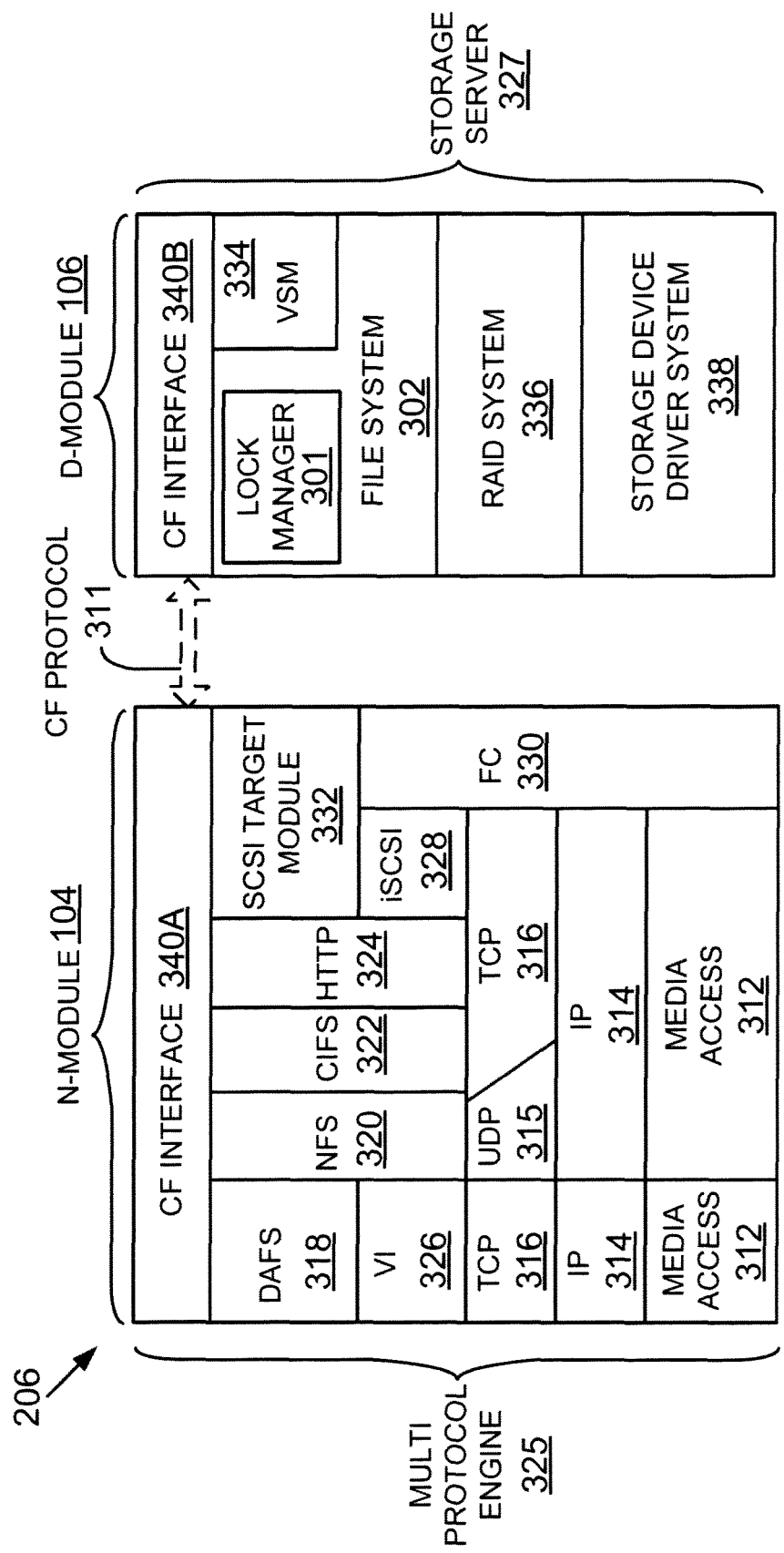

FIG. 3B shows a detailed block diagram of the storage operating system 206, according to one embodiment. The storage operating system 206 comprises a series of processor executable layers organized to form an integrated network protocol stack or, more generally, a multi-protocol engine 325 that provides data paths for clients to access information stored on a node 102 using block and file access protocols. The multi-protocol engine includes a media access layer 312 (part of layer 308, FIG. 3A) of network drivers (e.g., Gigabit Ethernet drivers) that interfaces with network protocol layers (part of layer 304, FIG. 3A), such as the IP layer 314 and its supporting transport mechanisms, the TCP layer 316 and the User Datagram Protocol (UDP) layer 315.

A file system protocol layer provides multi-pro file access and, to that end, includes support for the Direct Access File System (DAFS) protocol 318, the protocol 320, the CIFS protocol 322 and the HTTP protocol 324.

A virtual interface ("VI") layer 326 implements the VI architecture to provide direct access transport (DAT) capabilities, such as remote direct memory access (RDMA), as required by the OAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns (where luns are represented as blocks) to either iSCSI or FCP or, alternatively, to both iSCSI and FCP when accessing the blocks on the node 102.

In addition, the storage operating system 206 includes a series of processor executable layers organized to form a storage server 327 that provides data paths for accessing information stored on the storage devices 108 of the node 102. To that end, the storage server 327 includes the file system module 302 in cooperating relation with a volume stripped module (VSM) 334, a RAID system module 336 and a storage device driver system module 338. The VSM cooperates with the file system 302 to enable storage server 327 to service a volume.

The RAID system 336 manages the storage and retrieval of information to and from the volumes/storage devices in accordance with I/O operations, while the storage device driver system 338 implements a storage device access protocol such as, e.g., the SCSI protocol.

The file system 302 implements a virtualization system of the storage operating system 206 through the interaction with one or more virtualization modules illustratively embodied as, e.g., a virtual disk (vdisk) module (not shown) and a SCSI target module 332. The SCSI target module 332 is generally disposed between the FC and iSCSI drivers 328, 330 and the file system 302 to provide a translation layer of the virtualization system between the block (lun) space and the file system space, where luns are represented as blocks.

The file system 302 is illustratively a message-based system that provides logical volume management capabilities for use in access to the information stored on the storage devices, such as disks. That is, in addition to providing file system semantics, the file system 302 provides functions normally associated with a volume manager. These functions include (i) aggregation of the storage devices, (ii) aggregation of storage bandwidth of the storage devices, and (iii) reliability guarantees, such as mirroring and/or parity (RAID).

The file system 302 illustratively may implement the write-anywhere file system having an on-disk format representation that is block-based using, e.g., 4 kilobyte (KB) blocks and using index nodes ("inodes") to identify data containers and data container attributes (such as creation time, access permissions, size and block location and lock information). The file system 302 uses data containers to store meta-data describing the layout of its file system; these meta-data data containers include, among others, an inode data container. A data container handle, i.e., an identifier that includes an inode number (inum), may be used to retrieve an inode from storage device.

Broadly stated, all inodes of the write-anywhere file system are organized into the inode data container. A file system (fs) info block specifies the layout of information in the file system and includes an inode of a data container that includes all other inodes of the file system. Each logical volume (file system) has an fsinfo block that is preferably stored at a fixed location within, e.g., a RAID group. The inode of the inode data container may directly reference (point to) data blocks of the inode data container or may reference indirect blocks of the inode data container that, in turn, reference data blocks of the inode data container. Within each data block of the inode data container are embedded modes, each of which may reference indirect blocks that, in turn, reference data blocks of a data container.

Operationally, a request from the client 114 is forwarded as a packet over the computer network 112 and onto the node 102 where it is received at the network adapter 210. A network driver processes the packet and, if appropriate, passes it on to a network protocol and file access layer for additional processing prior to forwarding to the writ anywhere file system 302. Here, the file system generates operations to load (retrieve) the requested data from storage device 108 if it is not resident "in core", i.e., in memory 204.

If the information is not in memory, the file system 302 indexes into the inode data container using the inode number (inum) to access an appropriate entry and retrieve a logical vbn. The file system then passes a message structure including the logical vbn to the RAID system 336; the logical vbn is mapped to a storage device identifier and storage device block number (storage device,dbn) and sent to an appropriate driver (e.g., SCSI) of the storage device driver system 338. The storage device driver 338 accesses the dbn from the specified storage device 108 and loads the requested data block(s) in memory for processing by the node. Upon completion of the request, the node (and operating system) returns a reply to the client 114.

It should be noted that the software "path" through the operating system layers described above needed to perform data storage access for a client request received at node 102 may alternatively be implemented in hardware. That is, in an alternate embodiment of the disclosure, the storage access request data path may be implemented as logic circuitry embodied within a field programmable gate array (FPGA) or an ASIC. This type of hardware implementation increases the performance of the file service provided by node 102 in response to a file system request issued by client 114.

As used herein, the term "storage operating system" generally refers to the computer-executable code operable on a computer to perform a storage function that manages data access and may, in the case of a node 102, implement data access semantics of a general purpose operating system. The storage operating system can also be implemented as a microkernel, an application program operating over a general-purpose operating system, such as UNIX® or Windows XPO, or as a general-purpose operating system with configurable functionality, which is configured for storage applications as described herein.

In addition, it will be understood to those skilled in the art that the disclosure herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

In the illustrative embodiment, the storage server 327 is embodied as D-Module 106 to service one or more volumes of array 110. In addition, the multi-protocol engine 325 is embodied as N-Module 104 to (i) perform protocol termination with respect to a client issuing incoming data access request packets over the network 112, as well as (ii) redirect those data access requests to any storage server 327 of the cluster 100. Moreover, the N-Module 104 and D-Module 106 cooperate to provide a highly-scalable, distributed storage system architecture of the cluster 100. To that end, each module includes a cluster fabric (CF) interface module 340A and 340B adapted to implement intra-cluster communication among the modules, including D-Module-to-D-Module communication for implementing the embodiments described herein.

The protocol layers, e.g., the NFS/CIFS layers and the iSCSI/FC layers, of the N-Module 104 function as protocol servers that translate file-based and block based data access requests from clients into CF protocol messages used for communication with the D-Module 106. That is, the N-Module servers convert the incoming data access requests into file system primitive operations (commands) that are embedded within CF messages by the CF interface module 340 for transmission to the D-Modules 106 of the cluster 100. Notably, the CF interface modules 340A and 340B cooperate to provide a single file system image across all D-Modules 106 in the cluster 100. Thus, any network port of an N-Module that receives a client request can access any data container within the single file system image located on any D-Module 106 of the cluster.

Further to the illustrative embodiment, the N-Module 104 and D-Module 106 are implemented as separately-scheduled processes of storage operating system; however, in an alternate embodiment, the modules may be implemented as pieces of code within a single operating system process. Communication between an N-Module and D-Module is thus illustratively effected through the use of message passing between the modules although, in the case of remote communication between an N-Module and D-Module of different nodes, such message passing occurs over the cluster switching fabric 116.

A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection methods/functions constituting a CF application programming interface (API). Examples of such an agnostic protocol are the SpinFS and SpinNP protocols available from NetApp Inc.

The CF interface module 340 implements the CF protocol 311 for communicating file system commands among the modules of cluster 100. Communication is illustratively effected by the D-Module exposing the CF API to which an N-Module (or another D-Module) issues calls. To that end, the CF interface module 340 is organized as a CF encoder and CF decoder. The CF encoder of, e.g., CF interface 340A on N-Module 104 encapsulates a CF message as (i) a local procedure call (LPC) when communicating a file system command to a D-Module 106 residing on the same node 102 or (ii) a remote procedure call (RPC) when communicating the command to a D-Module residing on a remote node of the cluster 100. In either case, the CF decoder of CF interface 340B on D-Module 106 de-encapsulates the CF message and processes the file system command.

As mentioned above file system 302 includes the lock manager 301 that maintains locks for clients for providing access to data containers. The lock manager 301 maintains the lock data structure 303 that is used for recovering locks when a node that interfaces with a client system becomes unavailable and another node takes over the storage space managed by the node that became unavailable. The failover approach and handling locks are now described below in detail.

Figure 3C:
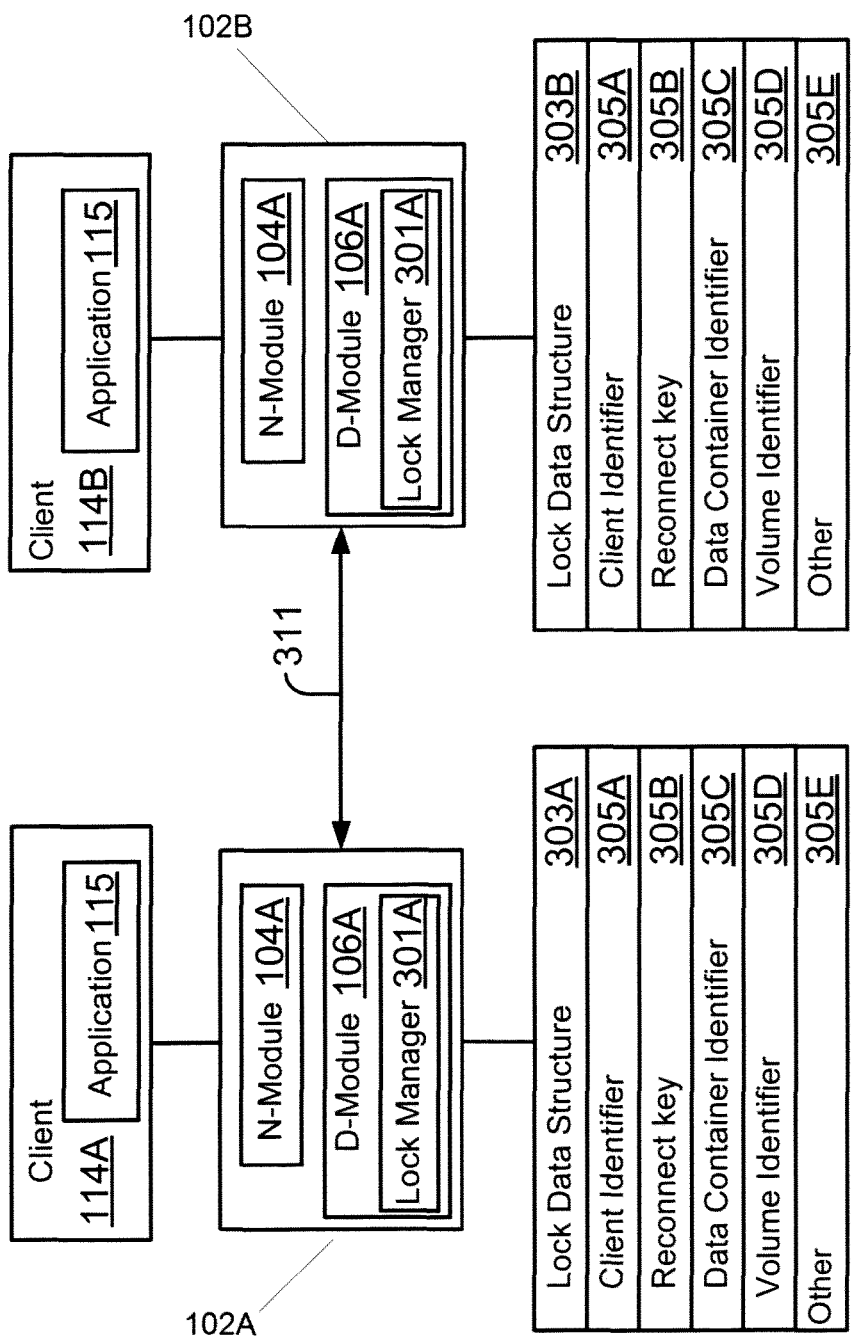
FIG. 3C shows an example of mirroring locks in network storage environment.

FIG. 3C shows two nodes 102A-102B that communicate with each other and maintain lock data structures 303A and 303B, according to one embodiment. Node 102A may provide storage access to client 114A and node 102B may provide access to client 114B. Nodes 102A-102B may be referred to as partner nodes, which means that if node 102A fails, then node 102B takes over the storage of node 102A to continue to provide access to client 114A and vice-versa. The process by which node 102B takes over the storage space managed by node 102A may be referred to as "take over".

When node 102A comes back on line and becomes available again, then node 102B provides storage back to node 102A such that node 102A may provide access to client 114A. This process is referred to as "give back".

The lock manager 301A for node 102A maintains the lock data structure 303A, while the lock manager 301B for node 102B maintains its lock data structure 303B. Lock data structure 303A includes information for all the locks that are granted by node 102A and may also include lock state information for locks that are granted by node 102B to client 114B. Similarly, lock data structure 303B includes information for the locks granted by node 102B and may also include lock state information for locks that are granted by node 102A to client 114A.

As an example, lock data structure 303A may include various fields, 305A-305E that may be used to recover a lock and may be referred to as "lock state". A client identifier 305A identifies a client system that has been granted a lock. A reconnect key 305B is used by a client to recover a lock for a persistent open lock type. The data container for which the lock is granted is identified by 305C. The storage volume associated with the data container is identified by 305D. A reserved field 305E may be used for any other information.

Figure 3D:
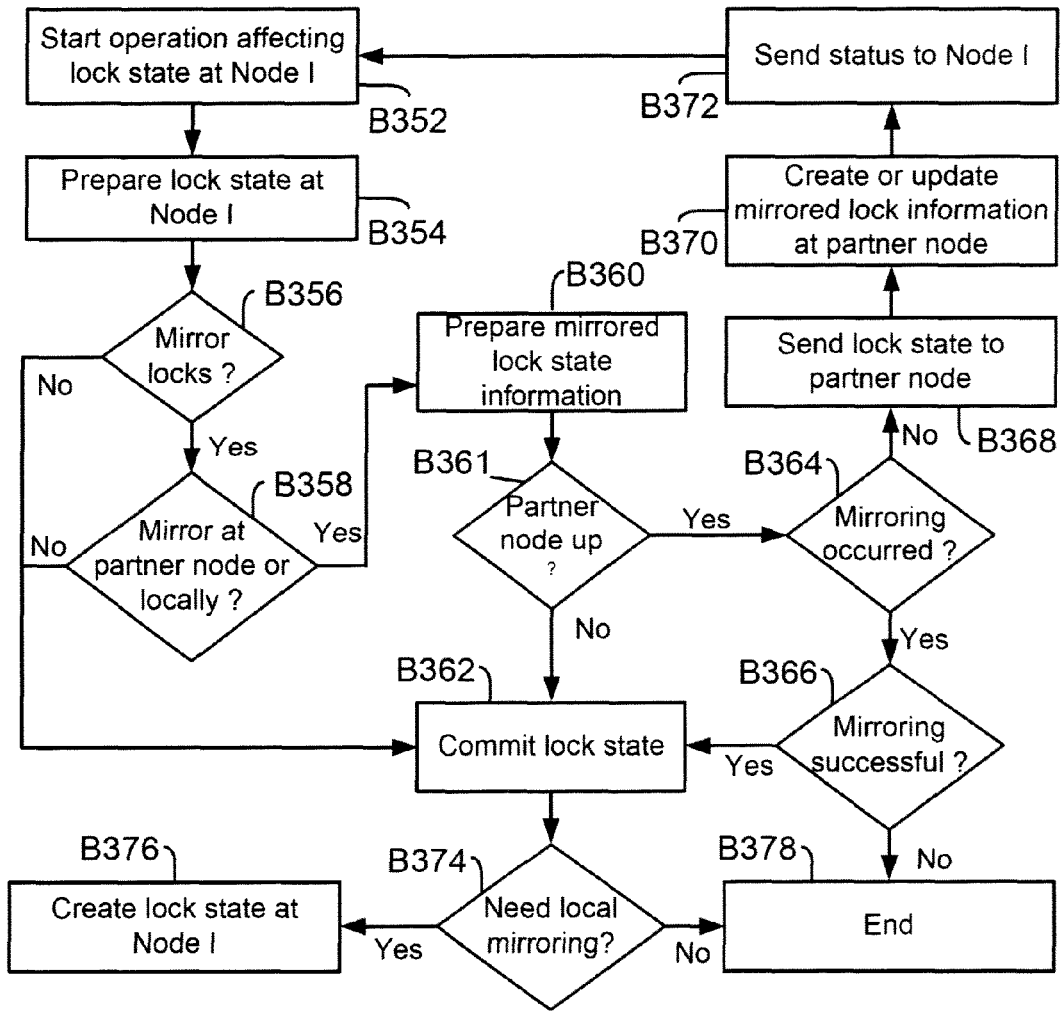
FIGS. 3D and 3E show process flow diagrams, according to one embodiment.

Process Flow:

FIG. 3D shows a process 350 for handling lock state information between partner nodes 102A-102B described above with respect to FIG. 3C, according to one embodiment. The process begins in block B352, when an operation affecting lock state associated with a data container is affected. For example, block B352 may be a portion of the process for handling a client request to open a data container for a read or write operation. Block B352 may be executed by the D-module 106 of node 102A (Node I).

In block B354, node 102A prepares the lock state at the local memory of node 102A (for example, 204, FIG. 2) i.e. lock state information is attached based on the lock type. The lock state would depend on the lock type as described below in detail.

In block B356, the lock manager 301A determines if the lock needs to be mirrored to the partner node 102B. The term "mirrored" as used herein means being replicated. A lock that has a persistent open feature will need to be mirrored, according to one embodiment. The lock manager 301A determines by evaluating the lock request, whether it includes a request for a persistent open. If the request includes a request for a persistent open, then the lock manager 301A decides to mirror the lock state to lock manager 301B so that lock data structure 303B can be updated, as described below. If the lock is not to be mirrored in block B356, then the process moves to block B362 that is described below.

If the lock is to be mirrored, then in block B358, the lock manager 301A determines if local or partner mirroring is needed. If local or partner mirroring is not needed, then the process moves to block B362. The term local mirroring as used herein means lock state mirrored at the local node, for example, 102A for a partner node, as described below in detail. The term partner mirroring means that the lock is replicated at a partner node, for example, 102B, which is a partner node of node 102A.

If local or partner mirroring is needed, then mirrored lock state information is prepared in block B360. The mirrored lock state information would depend on the lock type. For example, for a shared lock, the lock state information would include client identifier information 305A, reconnect key 305B, data container identifier 305C, and volume identifier 305D where the data container is stored or any other information. The reconnect key 305B is typically provided to client 114A for a persistent open lock. The client 114A uses the reconnect key when node 102A becomes unavailable and client 114A needs to use the same lock either when node 102A becomes available again or if node 102B takes over.

In block B361, node 102A determines if node 102B is available. Node 102A may determine this by sending a status message to node 102B using connection 116. If the partner 102B is unavailable, then the process moves to block B362, described below.

If partner 102B is available, then in block B364, the lock manager 301A determines if the lock state may already have been mirrored. If the lock state has already been mirrored, then in block B366, lock manager 301A determines if the mirroring was successful. This is typically determined by receiving a status messages from node 102B. If the mirroring succeeded, then the process moves to block B362. If the mirroring had not succeeded, then in block B378, the process ends and an error message is sent to client 114A.

If the mirroring has not occurred in block B364, then in block B368, the lock state (i.e. mirrored lock state) information (i.e. fields' 305A-305E) is sent by node 102A to node 102B. The lock state information includes minimal information that can be used by node 102B to generate a lock, if node 102A became unavailable.

In block B370, node 102B creates or updates the mirrored lock information at lock data structure 303B. Node 102B then sends a status to node 102A in block B372.

Referring to block B362, the lock state is committed to storage device 213 of node 102A from memory 204. Thereafter in block B374 determines if mirroring of any lock states is needed at node 102A. This may happen if node 102A has taken over 102B and lock state on 102B's storage is changed. Node 102A may take over node 102B, if node 102B becomes unavailable for some reason. Local mirroring may be needed when locks are created at a partner node or are changed at partner node while the node is in the "takeover" stage.

If local mirroring is not needed, then the process ends in block B378. If local mirroring is needed, then in block B376, node 102A creates the lock state information at lock data structure 303A.

Figure 3E:
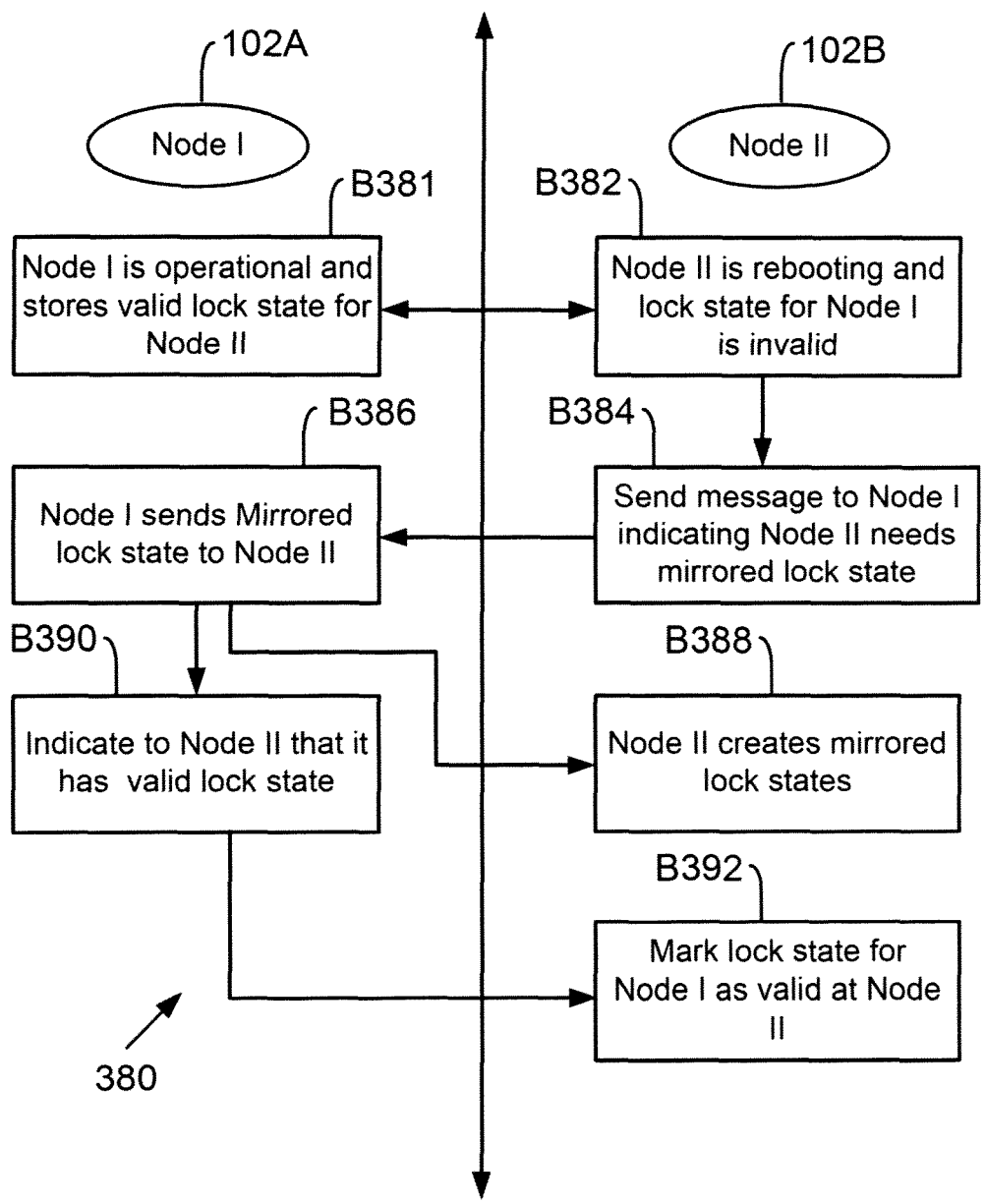

FIG. 3E shows a process flow 380 for exchanging lock state information between node 102A (shown as node I) and 102B (shown as node II), according to one embodiment. At the start of process 380, in block B381, node 102A is fully operational responding to client 114 requests, having valid lock states for it as well as partner node 102B. In block B382, as an example, node 102B is rebooting and hence the lock states for node 102A are invalid at node 102B memory. Node 102B may be rebooting for any reason, for example, communication failure or any other reason. When node 102B is unavailable, partner node 102A takes over the storage volumes of node 102B. Node 102A also generates locks that were maintained and issued by node 102B. Node 102A uses lock data structure 303A to generate the locks. It is noteworthy that blocks B381 and B382 may occur at the same time.

In block B384, node 102B sends a message to node 102A indicating that node 102A has valid lock state and node 102B needs mirrored lock state.

In block B386, as part of a give back procedure, node 102A sends mirrored lock state information for all locks that it has to node 102B. The lock states that are sent to node 102B may include the locks that are owned by node 102A and the locks that were owned by node 102B before the rebooting in block B382.

In block B388, node 102B generates locks based on the mirrored lock state information. These include locks that it owned before the reboot.

In block B390, node 102A indicates to node 102B that it owns valid locks for node 102A and 102B. Thereafter, in block B392, node 102B marks the lock state information for node 102A and 102B locks as valid in lock data structure 303B maintained by lock manager 301B.

The embodiments disclosed herein have advantages because when a node becomes unavailable and another node takes over, client access to data containers and locks is maintained because the partner node can construct the locks that were issued by the node that became unavailable. This is especially helpful in an environment where multiple clients are accessing data containers and using locks.

Figure 4:
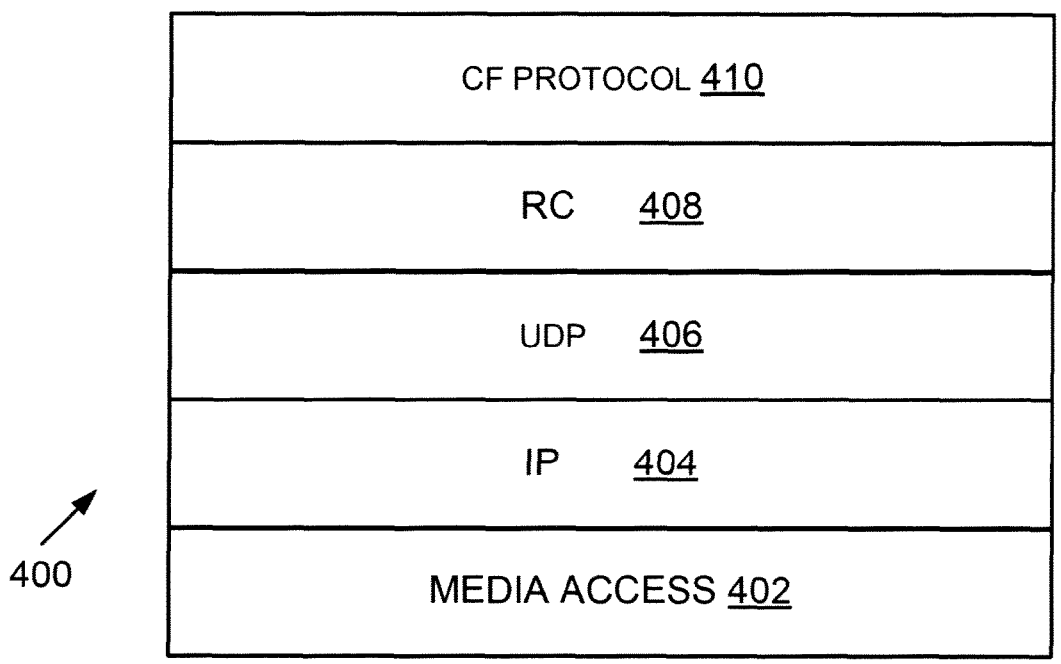
FIG. 4 shows an example of a message used according to one embodiment of the present disclosure.

CF Messaging:

FIG. 4 is a schematic block diagram illustrating the format of a CF message 400 that may be used to mirror lock state information or exchange lock state information, in accordance with an embodiment of the present disclosure. The CF message 400 is illustratively used for RPC communication over the switching fabric 116 between remote modules of the cluster 100; however, it should be understood that the term "CF message" may be used generally to refer to LPC and RPC communication between modules of the cluster.

The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an N-Module 104) to a destination (e.g., a D-Module 106). The RC layer 408 implements a reliable transport protocol that is adapted to process such envelopes in accordance with a connectionless protocol, such as UDP 406.

Figure 5:
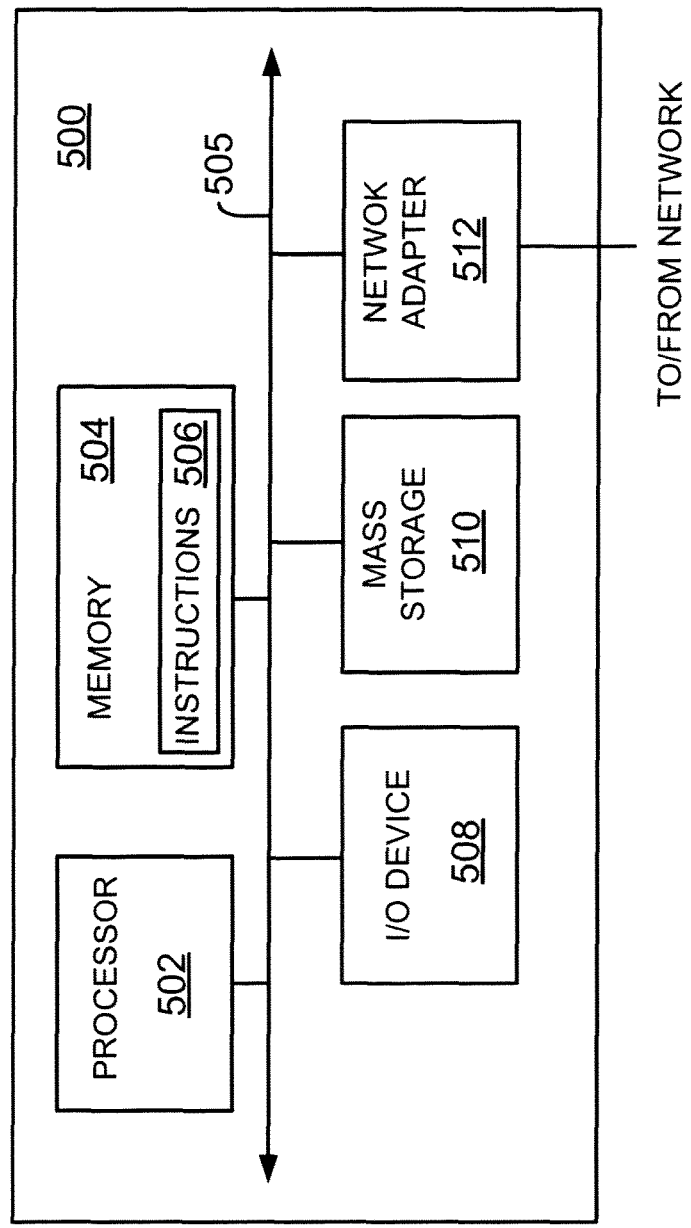
FIG. 5 shows a block diagram of a system, using the methodology of the present disclosure.

Processing System:

FIG. 5 is a high-level block diagram showing an example of the architecture of a processing system, at a high level, in which executable instructions as described above can be implemented. The processing system 500 can represent clients 114 and others. Note that certain standard and well-known components which are not germane to the present disclosure are not shown in FIG. 5.

The processing system 500 includes one or more processors 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 502 are the central processing units (CPUs) of the processing system 500 and, thus, control its overall operation. In certain embodiments, the processors 502 accomplish this by executing programmable instructions stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 which implements techniques introduced above may reside in and may be executed (by processors 502) from memory 504.

Also connected to the processors 502 through the bus system 505 are one or more internal mass storage devices 510, and a network adapter 512. Internal mass storage devices 510 may be or may include any conventional medium for storing large volumes of data in a non-volatile manner, such as one or more magnetic or optical based disks. The network adapter 512 provides the processing system 500 with the ability to communicate with remote devices (e.g., storage servers) over a network and may be, for example, an Ethernet adapter, a FC adapter, or the like. The processing system 500 also includes one or more input/output (I/O) devices 508 coupled to the bus system 505. The I/O devices 508 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. Details regarding these layers are not germane to the inventive embodiments.

Thus, a method and apparatus for managing locks have been described. Note that references throughout this specification to "one embodiment" or "an embodiment" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for a networked storage system having a first storage system node providing storage space to a client computing system at a first storage device and a second storage system node managing a second storage device, comprising;
   granting a lock by the first storage system node to the client computing system, in response to a lock request, for accessing a data container stored at the first storage device managed by a storage operating system of the first storage system node;
   evaluating the lock request by the first storage system node for determining if lock state information for the lock has to be mirrored at the second storage system node based on a lock feature of a lock type identified by the lock request; and
   mirroring the lock state information regarding the lock at the second storage system node when the lock feature includes a request for a persistent open feature that provides an exclusive right to the data container and allows the lock to stay open for a certain duration when the first storage system becomes unavailable and a reconnect key has to be used to obtain the lock;
   wherein the second storage system node generates the lock using the mirrored lock state information, when the first storage system node becomes unavailable and the second storage system node takes over the first storage device to interface with the client computing system to provide access to the data container using the generated lock.

2. The method of claim 1, wherein the first storage system node stores information regarding any locks generated by the second storage system node for any data container stored at the second storage device and made available to any client computing system such that the first storage system node can recover the lock, when the second storage system node becomes unavailable and the first storage system node takes over the second storage device.

3. The method of claim 1, wherein the lock is an opportunistic lock.

4. The method of claim 1, wherein the lock is a shared lock.

5. The method of claim 1, wherein the lock is a byte lock.

6. The method of claim 1, wherein the mirrored lock state information regarding the lock includes an identifier identifying the client computing system, the reconnect key that allows the client computing system to reconnect and obtain the lock from the second storage system node when the first storage system node becomes unavailable; an identifier identifying the data container and an identifier identifying a storage volume associated with the storage device used for storing the data container.

7. A non-transitory, machine readable storage medium storing executable instructions, which when executed by a machine, causes the machine to perform a method for a networked storage system having a first storage system node providing storage space to a client computing system at a first storage device and a second storage system node managing a second storage device, the method comprising;
   granting a lock by the first storage system node to the client computing system, in response to a lock request, for accessing a data container stored at the first storage device managed by a storage operating system of the first storage system node;
   evaluating the lock request by the first storage system node for determining if lock state information for the lock has to be mirrored at the second storage system node based on a lock feature of a lock type identified by the lock request; and
   mirroring the lock state information regarding the lock at the second storage system node when the lock feature includes a request for a persistent open feature that provides an exclusive right to the data container and allows the lock to stay open for a certain duration when the first storage system becomes unavailable and a reconnect key has to be used to obtain the lock;
   wherein the second storage system node generates the lock using the mirrored lock state information, when the first storage system node becomes unavailable and the second storage system node takes over the first storage device to interface with the client computing system to provide access to the data container using the generated lock.

8. The storage medium of claim 7, wherein the first storage system node stores information regarding any locks generated by the second storage system node for any data container stored at the second storage device and made available to any client computing system such that the first storage system node can recover the lock, when the second storage system node becomes unavailable and the first storage system node takes over the second storage device.

9. The storage medium of claim 7, wherein the lock is an opportunistic lock.

10. The storage medium of claim 7, wherein the lock is a shared lock.

11. The storage medium of claim 7, wherein the lock is a byte lock.

12. The storage medium of claim 7, wherein the mirrored lock state information regarding the lock includes an identifier identifying the client computing system, the reconnect key that allows the client computing system to reconnect and obtain the lock from the second storage system node when the first storage system node becomes unavailable; an identifier identifying the data container and an identifier identifying a storage volume associated with the storage device used for storing the data container.

13. A machine implemented method for a networked storage system having a first storage system node providing storage space to a client computing system at a first storage device and a second storage system node managing a second storage device, comprising;

mirroring lock state information for a lock having a persistent open feature granted by the first storage system executing a storage operating system to the client computing system at the second storage system node, such that the second storage system node can recover the lock from the mirrored lock state information, when the first storage system node becomes unavailable and the second storage system node takes over the first storage device to interface with the client computing system to provide access to a data container using the recovered lock; wherein the persistent open feature allows the lock to stay open for a certain duration when the first storage system becomes unavailable and a reconnect key has to be used to obtain the lock from the second storage system node; and notifying by the second storage system node to the first storage system node that the lock state information regarding any granted lock has been successfully mirrored at the second storage system node.

14. The method of claim 13, wherein the lock is one or more of an opportunistic lock, a shared lock and a byte lock.

15. A system, comprising:

a memory containing machine readable medium comprising machine executable code having stored thereon instructions; and a processor module coupled to the memory, the processor module configured to execute the machine executable code to:

grant a lock in response to a lock request, for accessing a data container stored at a first storage device managed by a first storage system node;

evaluate the lock request for determining if lock state information for the lock has to be mirrored at a second storage system node based on a lock feature of a lock type identified by the lock request; and mirror the lock state information regarding the lock at the second storage system node when the lock feature includes a request for a persistent open feature that provides an exclusive right to the data container and allows the lock to stay open for a certain duration when the first storage system becomes unavailable and a reconnect key has to be used to obtain the lock; wherein the second storage system node generates the lock using the mirrored lock state information, when the first storage system node becomes unavailable and the second storage system node takes over the first storage device to interface with the client computing system to provide access to the data container using the generated lock.

16. The system of claim 15, wherein the first storage system node stores information regarding any locks generated by the second storage system node for any data container stored at the second storage device and made available to any client computing system such that the first storage system node can recover the lock, when the second storage system node becomes unavailable and the first storage system node takes over the second storage device.

17. The system of claim 15, wherein the lock is an opportunistic lock.

18. The system of claim 15, wherein the lock is a shared lock.

19. The system of claim 15, wherein the lock is a byte lock.

20. The system of claim 15, wherein the mirrored lock state information regarding the lock includes an identifier identifying a client computing system, the reconnect key that allows the client computing system to reconnect and obtain the lock from the second storage system node when the first storage system node becomes unavailable; an identifier identifying the data container and an identifier identifying a storage volume associated with the first storage device used for storing the data container.

* * * * *